(12) United States Patent
Tawada

(10) Patent No.: US 10,747,492 B2
(45) Date of Patent: Aug. 18, 2020

(54) SIGNAL PROCESSING APPARATUS, SIGNAL PROCESSING METHOD, AND STORAGE MEDIUM

(71) Applicant: CANON KABUSHIKI KAISHA, Tokyo (JP)

(72) Inventor: Noriaki Tawada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/027,698

(22) Filed: Jul. 5, 2018

(65) Prior Publication Data
US 2019/0018641 A1 Jan. 17, 2019

(30) Foreign Application Priority Data
Jul. 13, 2017 (JP) .................................. 2017-137340

(51) Int. Cl.
*G06F 3/16* (2006.01)
*H04N 9/802* (2006.01)
*G11B 27/10* (2006.01)
*G11B 27/00* (2006.01)
*H04N 5/76* (2006.01)

(52) U.S. Cl.
CPC ............. *G06F 3/165* (2013.01); *G11B 27/005* (2013.01); *G11B 27/10* (2013.01); *H04N 5/76* (2013.01); *H04N 9/802* (2013.01)

(58) Field of Classification Search
CPC ....... G06F 3/165; G11B 27/005; G11B 27/10; H04N 5/76; H04N 9/802
See application file for complete search history.

(56) References Cited

U.S. PATENT DOCUMENTS

| 8,532,308 | B2 | 9/2013 | Tawada | |
|---|---|---|---|---|
| 9,134,167 | B2 | 9/2015 | Tawada | |
| 9,280,985 | B2 | 3/2016 | Tawada | |
| 9,704,505 | B2 | 7/2017 | Tawada | |
| 9,781,509 | B2 | 10/2017 | Tawada | |
| 2005/0163482 | A1* | 7/2005 | Noda ..................... | G11B 20/10 386/263 |
| 2007/0127437 | A1* | 6/2007 | Ozawa .................... | H04L 47/14 370/352 |
| 2007/0263986 | A1* | 11/2007 | Matsubara ............ | H04H 60/32 386/230 |

(Continued)

FOREIGN PATENT DOCUMENTS

JP 2017-9663 1/2017

*Primary Examiner* — Mishawn N. Hunter
(74) *Attorney, Agent, or Firm* — Venable LLP

(57) ABSTRACT

A signal processing apparatus for controlling an audio signal related to playback of sound to be performed together with playback of video that is based on a video signal is provided. The apparatus obtains information indicating a speed of the video at a point in time that is included in a playback period of the video signal, and controls, in a case where the speed of the video changes from a standard speed to a speed that differs from the standard speed at a specific point in time included in the playback period of the video signal, the audio signal based on the information obtained by the obtaining unit, such that a volume parameter for controlling a playback volume of the audio signal after the specific point in time differs from the volume parameter before the specific point in time.

18 Claims, 4 Drawing Sheets

(56) References Cited

U.S. PATENT DOCUMENTS

| | | | | |
|---|---|---|---|---|
| 2008/0133656 | A1* | 6/2008 | Hashimoto | H04L 65/604 709/203 |
| 2009/0013059 | A1* | 1/2009 | Partaker | H04L 65/1096 709/217 |
| 2009/0083799 | A1* | 3/2009 | Sakasegawa | H04N 5/4401 725/53 |
| 2009/0162033 | A1* | 6/2009 | Del Sordo | H04N 5/782 386/326 |
| 2010/0220974 | A1* | 9/2010 | Yamashita | G11B 27/005 386/344 |
| 2014/0363022 | A1* | 12/2014 | Dizon | H03G 3/3005 381/105 |
| 2015/0172540 | A1* | 6/2015 | Tomita | H04N 5/783 386/241 |
| 2018/0167649 | A1 | 6/2018 | Hayakawa | |

* cited by examiner

SIGNAL PROCESSING APPARATUS, SIGNAL PROCESSING METHOD, AND STORAGE MEDIUM

BACKGROUND OF THE INVENTION

Field of the Invention

The present invention relates to video and audio playback technologies.

Description of the Related Art

There exist technologies for capturing video data with a high frame rate and performing slow-motion playback of video. With such slow-motion playback, the frequency of the audio shifts to a low range when the waveform of the audio signal is extended to conform to slow-motion playback, and this can leave viewers with a sense of incongruity. To address this, Japanese Patent Laid-Open No. 2017-009663 discloses a technology for reducing the sense of incongruity by also obtaining audio recording data with a high sampling rate to generate audio data with little sense of incongruity, and by, furthermore, repeatedly playing back this audio data to reduce silent intervals. Also, Japanese Patent Laid-Open No. 2017-009663 discloses reducing the volume level every repetition, at the time of repetitive playback of audio.

The technique of Japanese Patent Laid-Open No. 2017-009663 reduces the volume level gradually after the video has switched to variable speed playback, and thus the volume level does not change immediately when the video expression is changed. Since there is thus no change in the audio expression when switching from normal playback to variable speed playback such as slow-motion playback or stop-motion playback, viewers can be left with a sense of incongruity.

SUMMARY OF THE INVENTION

The present invention reduces any sense of incongruity in audio expression when the video playback operation is changed.

According to one aspect of the present invention, there is provided a signal processing apparatus for controlling an audio signal related to playback of sound to be performed together with playback of video that is based on a video signal, comprising: an obtaining unit configured to obtain information indicating a speed of the video at a point in time that is included in a playback period of the video signal; and a control unit configured to control, in a case where the speed of the video changes from a standard speed to a speed that differs from the standard speed at a specific point in time included in the playback period of the video signal, the audio signal based on the information obtained by the obtaining unit, such that a volume parameter for controlling a playback volume of the audio signal after the specific point in time differs from the volume parameter before the specific point in time.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1:
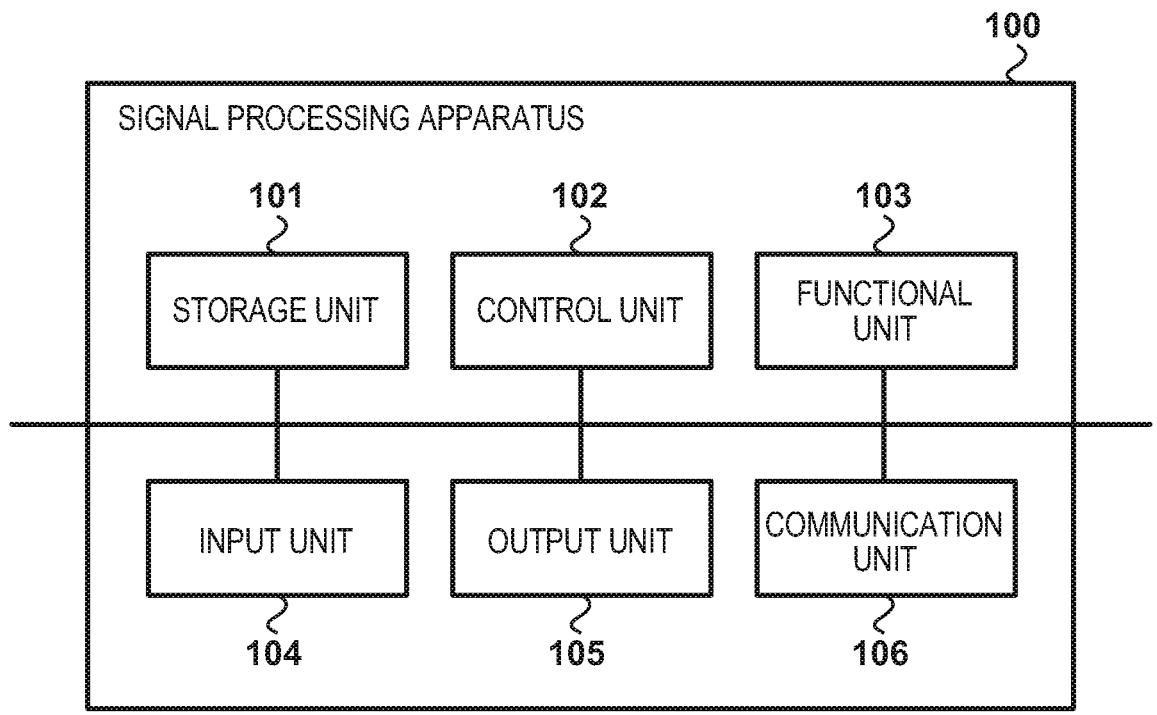
FIG. 1 is a block diagram showing an exemplary hardware configuration of a signal processing apparatus.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

The present embodiment describes a signal processing apparatus that generates a video signal and an audio signal based on a video capturing signal and an audio recording signal that are obtained by capturing video and recording audio, and performs playback control of video and audio, based on these video and audio signals. Note that the signal processing apparatus may be an image capturing apparatus having a camera and a microphone, and may be configured to obtain video capturing signals and audio recording signals from an external source, and perform signal processing on these signals. Also, video capturing signals and audio recording signals may be signals having a single viewpoint and a single listening point that are obtained with one camera and microphone or may be signals having a plurality of viewpoints and a plurality of listening points that are obtained with a plurality of cameras and microphones. Note that video capturing signals and audio recording signals relating to a plurality of viewpoints and a plurality of listening points may be respectively obtained from a plurality of cameras and microphones or may be obtained from an external device such as a server on which the signals are saved. Also, the signal processing apparatus can, in the case where video capturing signals and audio recording signals relating to a plurality of viewpoints and a plurality of listening points are obtained, generate a video signal and an audio signal corresponding to a viewpoint designated by a user, for example, based on these plurality of video capturing signals and audio recording signals. That is, a configuration can be adopted in which the signal processing apparatus is able to generate and output free viewpoint video (virtual viewpoint video) and free listening point audio (virtual listening point audio).

The signal processing apparatus is capable of executing normal playback for playing back video over the same length of time as at the time of video capture, and variable speed playback for playing back video at a different speed from the length of time at the time of video capture such as slow-motion playback or stop-motion playback. At this time, the signal processing apparatus, in the case where the mode is switched from normal playback to variable speed playback, changes the gain applied at the time of audio playback, such that the viewer is also able to recognize from the audio that the mode has been switched. The signal processing apparatus, in one example, reduces the audio playback gain to a specified value, at the timing of switching from normal playback to variable speed playback. The viewer is thereby able to recognize that the playback mode has been changed, due to the drop in volume that follows suppression of the audio playback gain. In particular, in the case of playing back free viewpoint video that enables images to be looked at from various viewpoints corresponding to the single point in time of video capture, video also continuously changes in the case where the viewpoint continuously changes, even when variable speed playback such as slow-motion playback or stop-motion playback is started. Thus, although it is difficult for the viewer to recognize that the playback mode has changed only from the video, recognizing the change in playback mode is facilitated by switching the audio playback gain at the timing at which the video switches from normal playback to variable speed playback as described in the present embodiment. Note that, hereinafter, an example of suppressing the audio playback gain will be described, with the term "gain" being described as a concept that not only indicates sound pressure but also includes volume, throughout this specification and the appended claims.

Hereinafter, the configuration of such a signal processing apparatus and an example of processing that is executed by the signal processing apparatus will be described in detail.

Configuration of Signal Processing Apparatus

FIG. 1 is a block diagram showing an exemplary hardware configuration of a signal processing apparatus 100 according to the present embodiment. The signal processing apparatus 100 has, as an example of a hardware configuration thereof, a storage unit 101, a control unit 102, a functional unit 103, an input unit 104, an output unit 105 and a communication unit 106. Note that the signal processing apparatus 100 can be realized by a suitable computer such as a personal computer (PC), a smartphone or a tablet computer. For example, the signal processing apparatus 100 may be a computer mounted in a head-mounted display (HMD).

The storage unit 101 is configured by one or both of a ROM and a RAM, and stores programs for performing various operations which will be described later and various information such as communication parameters for wireless communication. Note that apart from memories such as a ROM and a RAM, storage media that may be used as the storage unit 101 include a flexible disk, a hard disk, an optical disc, a magneto-optical disc, a CD-ROM, a CD-R, a magnetic tape, a nonvolatile memory card and a DVD.

In the present embodiment, the storage unit 101 holds video capturing signals captured with the camera and audio recording signals recorded with the microphone. Here, time information is assigned to the video capturing signals and the audio recording signals and, furthermore, position and orientation information of the camera and the microphone can be assigned. In the present embodiment, it is assumed that the position and orientation information of the camera and the microphone is assigned to video capturing signals and audio recording signals, for the purpose of correspondence with free viewpoint video and free listening point audio.

The control unit 102 is constituted by a CPU or an MPU, and performs overall control of the signal processing apparatus 100 by executing programs stored in the storage unit 101. Note that the control unit 102 may be configured to perform overall control of the signal processing apparatus 100 through cooperation between an OS (Operating System) and programs stored in the storage unit 101.

Also, the control unit 102 controls the functional unit 103 to execute various functions of the signal processing apparatus 100. The functional unit 103 is hardware for the signal processing apparatus 100 to execute predetermined processing. For example, in the case where the signal processing apparatus 100 has a video camera function, the functional unit 103 is a video capturing unit and an audio recording unit, and performs processing for capturing video and recording audio. Also, in the case where the signal processing apparatus 100 has a projection function, for example, the functional unit 103 is a projection unit and performs projection processing. The data that is processed by the functional unit 103 may be data that is stored in the storage unit 101 or may be data communicated by another device via the communication unit 106 which will be discussed later.

The input unit 104 accepts various operations from the user. The output unit 105 performs various types of output to the user. Here, output by the output unit 105 includes at least one of display of a screen, audio output by a speaker, vibration output and the like. Note that a configuration may be adopted in which the input unit 104 and the output unit 105 are together realized by one module such as a touch panel. In the present embodiment, a touch panel is used as the input unit 104 and the output unit 105, the output unit 105 displays GUIs (Graphical User Interfaces), and the input unit 104 accepts user operations via the GUIs. Also, the output unit 105 is configured so as to output at least video and audio, but can, with regard to the output of audio, for example, have a different audio output mechanism from a touch panel, such as headphones. That is, the video display mechanism of the output unit 105 can be constituted together with the input unit 104 by a touch panel, and the audio output mechanism of the output unit 105 can be constituted by separate hardware from a touch panel.

The communication unit 106 performs control of wired or wireless communication, and control of IP communication. The signal processing apparatus 100 is able to obtain video capturing data, audio recording data and the like from other devices via the communication unit 106, and store the obtained data in the storage unit 101. Note that the signal processing apparatus 100 may obtain video capturing data and audio recording data via the communication unit 106, or may obtain this data by reading an external storage medium that stores the data with a dedicated drive, for example.

Figure 2:
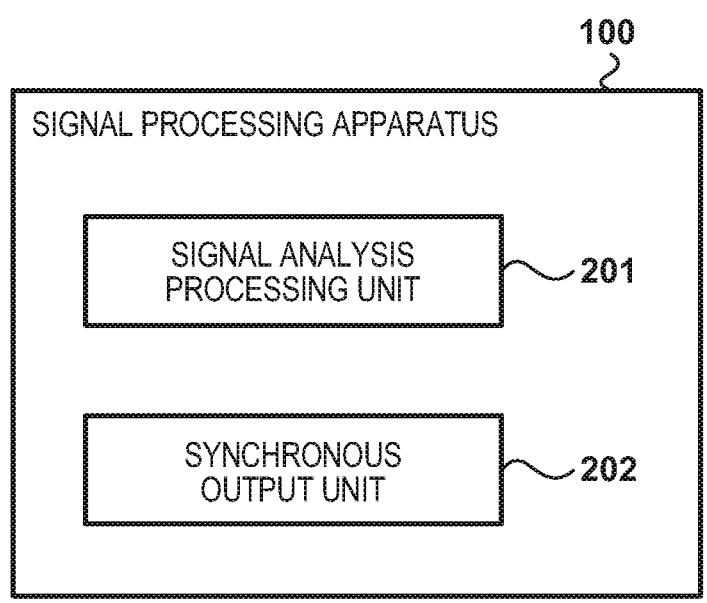
FIG. 2 is a block diagram showing an exemplary functional configuration of the signal processing apparatus.

Next, an exemplary functional configuration of the signal processing apparatus 100 will be described using FIG. 2. The signal processing apparatus 100 has, as a functional configuration thereof, a signal analysis processing unit 201 and a synchronous output unit 202. Note that these functional units are realized by the control unit 102 executing an application program that is stored in the storage unit 101. In FIG. 2, the signal analysis processing unit 201 performs analysis processing of video capturing signals, audio recording signals and the like stored in the storage unit 101, and generates a video signal and audio signal for playback. The synchronous output unit 202 executes control for synchronizing the video signal and audio signal generated by the signal analysis processing unit 201, and outputting the synchronized signals to the output unit 105. Note that the synchronous output unit 202 may output the generated video signal and audio signal to an external playback apparatus or storage device via the communication unit 106 in order to play back the signals on an external device, instead of or in addition to outputting the signals to the output unit 105. Also, the synchronous output unit 202 may store the generated video signal and audio signal in the storage unit 101, instead of or in addition to outputting the signals to the output unit 105. Note that although the present embodiment describes the case where the signal processing apparatus 100 generates both the video signal and audio signal for playback, the present invention is not limited thereto. For example, the signal processing apparatus 100 obtains information relating to the playback speed of video, and generates and outputs an audio signal based on that information. A separate device from the signal processing apparatus 100 may generate and output a video signal to be played back together with an audio signal that is generated by the signal processing apparatus 100. That is, a configuration may be adopted in which the signal processing apparatus 100 does not obtain a video signal itself.

Flow of Processing

Figure 3:
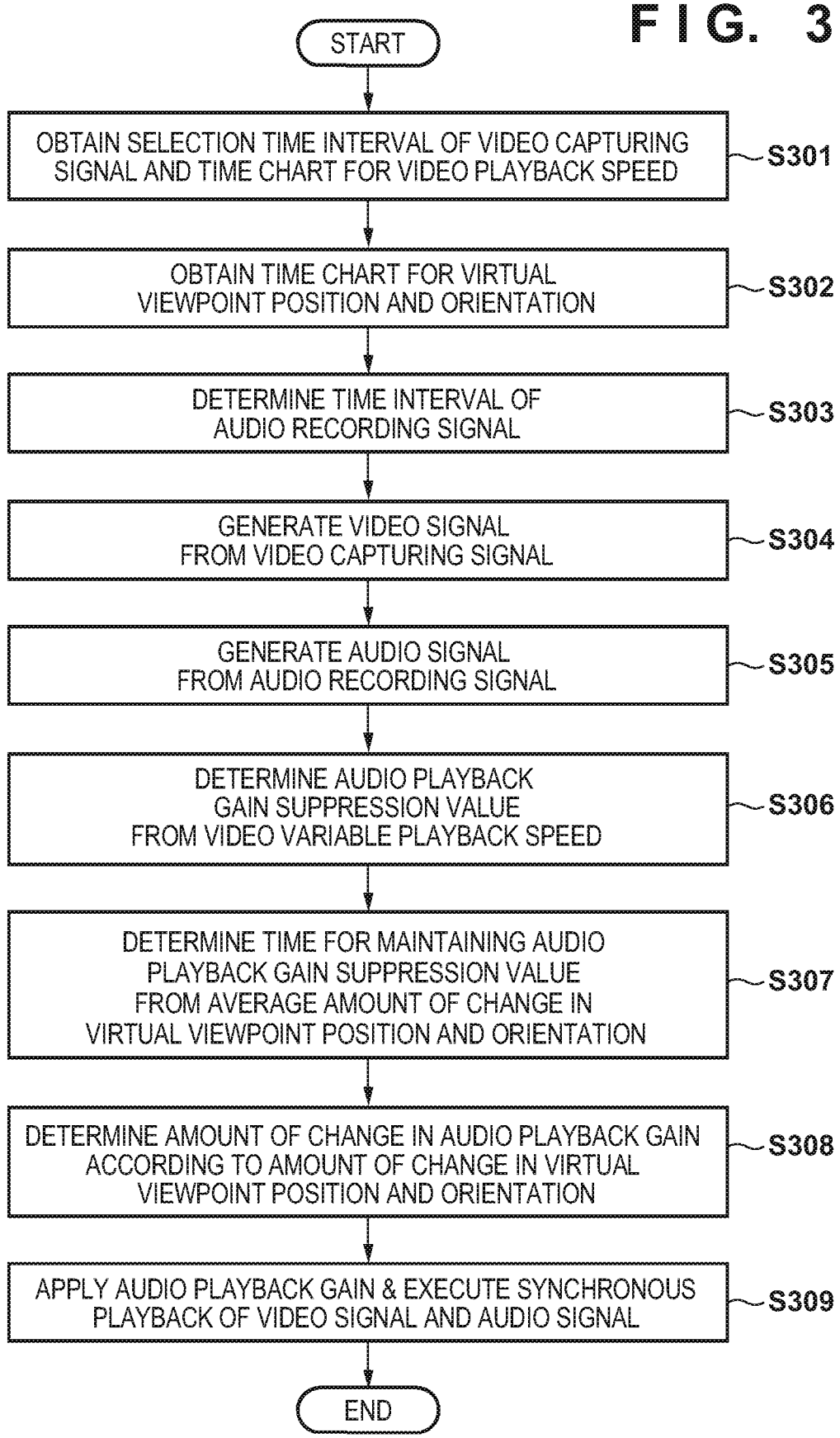
FIG. 3 is a flowchart showing an example of the flow of processing that is executed by the signal processing apparatus.

Next, an example of the flow of processing that is executed by the signal processing apparatus 100 will be described using FIG. 3. The processing of FIG. 3 is realized by, for example, the control unit 102 executing an application program that is stored in the storage unit 101. Also, the processing of FIG. 3 is started at the timing at which the signal processing apparatus 100 accepts an instruction by the user to start processing relating to obtaining a video capturing signal and an audio recording signal and generating a video signal and audio signal for playback. The start timing of the processing of FIG. 3 is, however, not limited thereto.

When the processing is started, first, in step S301, the signal processing apparatus 100 obtains a selection time interval of the video capturing signal to be used in generating a video signal and a time chart for video playback speed, as a result of a user operation or in accordance with a request from an external device, for example. The selection time interval of the video capturing signal is information indicating a time interval designated by a user operation as a target for video playback, out of the time interval on a video capturing time axis. Also, the time chart for video playback speed is information designating the way in which to change the video playback speed in the selected time interval. Note that the video playback speed may be described based on time on the video capturing time axis or may be described based on time on a playback time axis.

Figure 4:
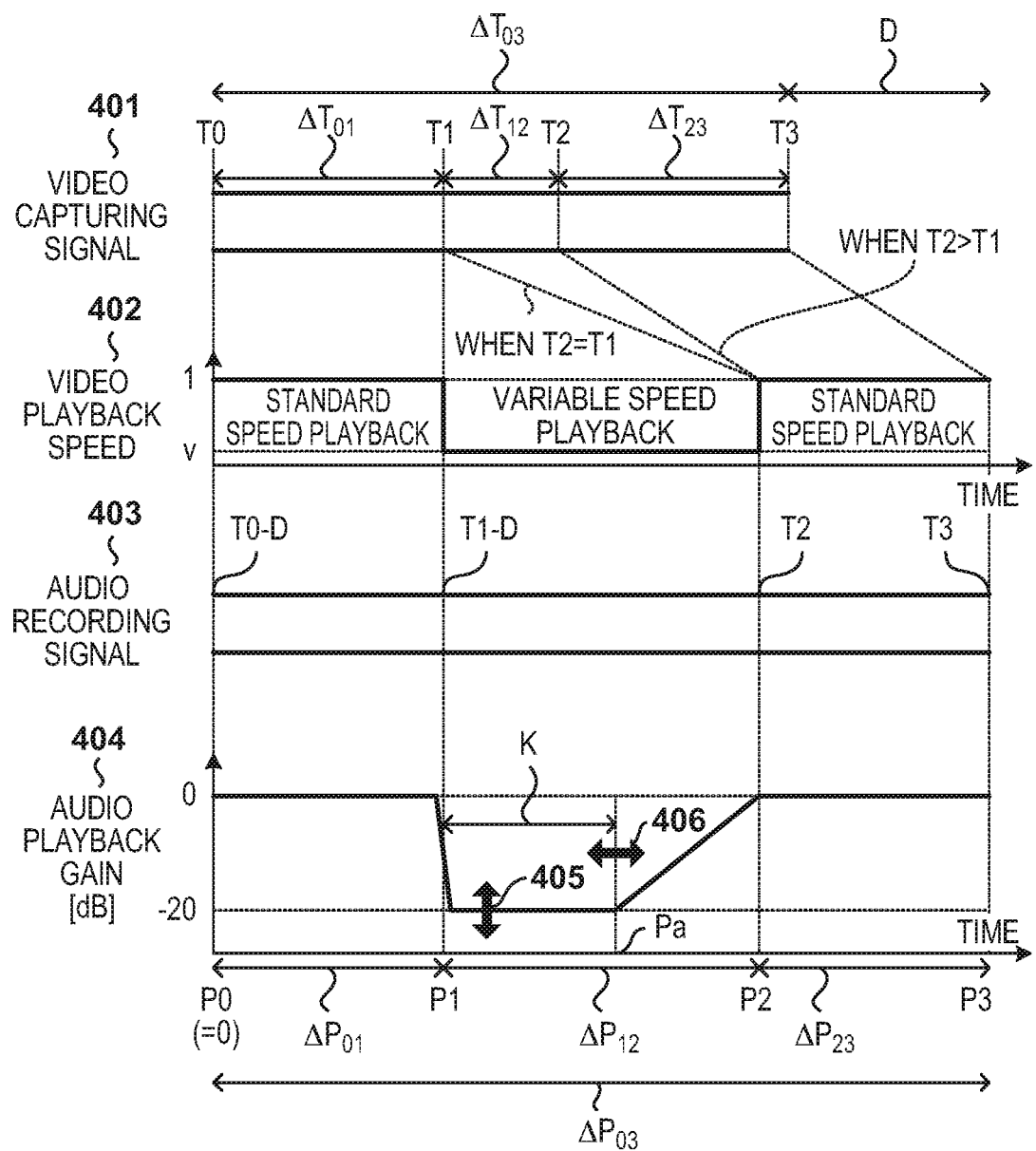
FIG. 4 is a diagram illustrating playback of video and audio according to an embodiment.

Here, as shown by a video capturing signal 401 in FIG. 4, for example, it is assumed that times T0 to T3 are selected as the selection time interval of the video capturing signal. Note that, in FIG. 4, Ti (where i is an integer) represents time during video capturing and audio recording, and Pj (where j is an integer) represents time during playback (viewing and listening). Here, it is assumed that, as shown by a video playback speed 402, the video signal that is generated from a video capturing signal having a time length $\Delta T_{01}$ from times T0 to T1 (=T1−T0) is set so as to be played back for a time length $\Delta P_{01}$ from P0 (=0) to P1 (=P1−P0) on the playback time axis. Similarly, it is assumed that the video signal that is generated from a video capturing signal having a time length $\Delta T_{12}$ from times T1 to T2 (=T2−T1) is set so as to be played back for a time length $\Delta P_{12}$ from P1 to P2 (=P2−P1) on the playback time axis. Also, it is assumed that the video signal that is generated from a video capturing signal having a time length $\Delta T_{23}$ from times T2 to T3 (=T3−T2) is set so as to be played back for a time length $\Delta P_{23}$ from P2 to P3 (=P3−P2) on the playback time axis.

Here, a video playback speed $v=\Delta T/\Delta P$ is defined as a ratio of a time length $\Delta T$ of a video capturing signal and a time length $\Delta P$ on the playback time axis of a video signal that is generated from a video capturing signal of $\Delta T$. With this video playback speed, v=1 corresponds to uniform speed playback, 0<v<1 corresponds to slow-motion playback, and v=0 corresponds to stop-motion playback. Note that, hereinafter, v=1 may be called a standard speed and uniform speed playback may be called standard speed playback. Also, hereinafter, playback at 0≤v<1 (generally v≠1) and including slow-motion playback and stop-motion playback is called variable speed playback. In the example in FIG. 4, since $v_{01}=\Delta T_{01}/\Delta P_{01}=1$ and $v_{23}=\Delta T_{23}/\Delta P_{23}=1$, standard speed playback is performed in the playback periods P0 to P1 and P2 to P3. On the other hand, since $v_{12}=\Delta T_{12}/\Delta P_{12}<1$, variable speed playback is performed in the playback period P1 to P2. Note that variable speed playback in the playback period P1 to P2 is slow-motion playback in the case where T2>T1 and is stop-motion playback in the case where T2=T1 ($\Delta T_{12}=0$).

In step S302, the signal processing apparatus 100 obtains a time chart for virtual viewpoint position and orientation that is used in generating an audio signals and video signal for free viewpoints in subsequent processing, as a result of a user operation or in accordance with a request from an external device, for example. The time chart for virtual viewpoint position and orientation is information that is designated by the user and indicates the timing and viewpoint for watching video. Virtual viewpoint positions and orientations are described on the playback time axis, and are, for example, designated over a time length $\Delta P_{03}$ (=P3−P0) from P0 to P3 in FIG. 4. Note that in operation input by the user, a joystick or the like dedicated to inputting positions and orientations, for example, may be used rather than GUIs.

In step S303, the signal processing apparatus 100 determines the time interval of the audio recording signal that is for use in generating an audio signal to be synchronously played back with the video signal. First, the signal processing apparatus 100 calculates a difference D (=$\Delta P_{03}-\Delta T_{03}$) of a time length $\Delta T_{03}$ (=T3−T0) of the selection time interval of the video capturing signal and a time length $\Delta P_{03}$ of the video signal to be generated. Here, variable speed playback of $v_{12}<1$, that is, $\Delta P_{12}>\Delta T_{12}$ is included in the time chart for video playback speed. Thus, D=$\Delta P_{03}-\Delta T_{03}=\Delta P_{12}-\Delta T_{12}>0$. In this case, the signal processing apparatus 100, as one example, takes a time interval (T0−D) to T3 that extends by a period D further into the past in the time direction than the selection time interval T0 to T3 for the video signal, as the time interval of the audio recording signal to be used in generating an audio signal to be synchronously played back with the video signal. That is, the signal processing apparatus 100 determines the time interval of the audio recording signal having the same time length T3−T0+D=$\Delta T_{03}$+D=$\Delta P_{03}$ as the video signal during playback and having the same time as the recording time of the video signal at the end of playback. Note that in the case of extending the time interval of the audio recording signal, the present invention is not limited to extension to the direction of the past on an audio recording time axis, and extension in the direction of the future may also be carried out. Also, extension of the time interval of the audio recording signal may be carried out in the directions of both the past and the future, such that the use times of the video capturing signal and the audio recording signal at a specific timing on the playback time axis coincide. Note that the signal processing apparatus 100 similarly, in the case where there are a plurality of variable speed playback intervals, determines the time interval of the audio recording signal, such that the time length of the audio recording signal is longer than the time length of the video capturing signal, by an amount obtained by subtracting the time length of the selection time interval of the video capturing signal from the time length of the video signal to be generated. An audio signal of the same time length as the video signal can thereby be generated, without performing waveform extension which is linked to sound quality degradation.

In the case of the example in FIG. 4, in the playback interval P0 to P1 on the playback time axis, the video capturing signal of times T0 to T1 is used, whereas the audio recording signal of times (T0–D) to (T1–D) is used, as shown by an audio recording signal 403. Similarly, the video capturing signal of times T1 to T2 and the audio recording signal of times (T1–D) to T2 are used in the playback interval P1 to P2, and the video capturing signal and the audio recording signal of times T2 to T3 are both used in the playback interval P2 to P3. For example, in a sports scene, variable speed playback such as slow-motion and stop-motion is performed during play of interest, and scenes in which the excitement rises such as scoring scenes (highly important scene) are played back in intervals where standard speed playback is performed after the variable speed playback is released. At this time, effective production can be performed, by ensuring that the time intervals of the video capturing signal and the audio recording signal coincide in such scenes.

In step S304, the signal processing apparatus 100 generates a video signal for playback from the video capturing signal, using the selection time interval of the video capturing signal and the time chart for video playback speed obtained in step S301, and the time chart for virtual viewpoint position and orientation obtained in step S302. Here, a three-dimensional model of the video capturing target is constructed, based on a plurality of video capturing signals and the respective positions and orientations of the cameras that captured those video capturing signals. Note that construction of the three-dimensional model of the video capturing target is performed using a well-known technology. The signal processing apparatus 100 thereby generates a video signal that recreates how the video capturing target looks when viewed from an arbitrary virtual viewpoint position and orientation in line with the time charts. In particular, in an interval where variable speed playback such as stop-motion or slow-motion is performed, a plurality of video signal frames having different viewpoints are generated from the video capturing signal frames of a plurality of cameras captured at a single time. Note that the number of the video signal frames that are generated is determined depending on the video playback frame rate. The generated video signal frames are continuously played back on the playback time axis in subsequent steps.

Note that in cases such as where there is one video capturing signal (one camera), for example, the video capturing signal may be directly used as the video signal without obtaining virtual viewpoint information in step S302. With regard to variable speed playback, the setting of the video playback frame rate of the video signal may be simply changed according to the variable playback speed. Alternatively, variable speed playback may be realized, by displaying the same video capturing signal frame multiple times at a constant video playback frame rate, or by generating video signal frames through performing interpolation processing using video capturing signal frames that are temporally adjacent to each other.

In step S305, the signal processing apparatus 100 generates an audio signal for headphone playback from the audio recording signal, using the time interval of the audio recording signal obtained in step S303 and the time chart for virtual viewpoint position and orientation obtained in step S302. Here, in order to recreate the sound field in the case where it is assumed that sound is heard at a virtual viewpoint position and orientation in line with the time chart, an audio signal that sounds as if the sounds of the respective audio recording signals (sounds collected using a microphone) are being played back from the respective directions thereof is generated.

For example, the following processing is executed on an audio recording signal having the same time length as the video signal generated in step S304, for every time block having a predetermined time length (e.g., time length that conforms to the video playback frame rate). First, coordinates indicating the position of the audio recording signal (position of the microphone) described in a global coordinate system are converted into coordinates of a head coordinate system defined by a virtual viewpoint position and orientation corresponding to the current time block, and, furthermore, conversion from orthogonal coordinate representation into spherical coordinate representation is performed. Head-related transfer functions (HRTF) for the left ear and the right ear corresponding to the direction of each audio recording signal (direction of the microphone) are then applied to the plurality of audio recording signals of the current time block, and the right and left signals for headphone playback are cumulatively added to generate the audio signal of the current time block. A virtual speaker that plays back the sound of each audio recording signal is thereby able to realize audio effects similar to when speakers are arranged around the user.

Note that HRTFs that are held in advance in the storage unit 101 and HRTFs obtained via the communication unit 106, for example, are used. Note that distance attenuation for every audio recording signal with respect to the virtual viewpoint position can be represented, by obtaining (e.g., through calculation) the distance between the position of each audio recording signal (position of the microphone) and the virtual viewpoint position, and attenuating the audio recording signals according to the respective distances. Note that attenuation of an audio recording signal is represented by, for example, dividing the audio recording signal by the corresponding distance or the square (or predetermined power) of the distance. Also, a configuration may be adopted in which the distance delay difference for every audio recording signal with respect to the virtual viewpoint position is represented, by adding distance delays corresponding to the respective distances to the audio recording signals. Note that generation of the audio signal is not limited to the abovementioned technique, and various techniques can be used. For example, an audio signal can be generated by analyzing the audio recording signals to identify the positions and sounds of a large number of sound sources, estimating the amount of attenuation and propagation delay of the sounds for each sound source from the relationship between the position thereof and the virtual viewpoint position, and cumulatively adding the sounds from the sound sources after attenuating and delaying the sounds according to the respective estimated values.

An audio signal having the same time length as the video signal is generated as a result of the audio signal of the current time block generated as described above being overlap-added to the audio signals of time blocks up to and including the previous time block after being multiplied by a window function. Note that the processing for generating the video signal of step S304 and the processing for generating the audio signal of step S305 may be performed in parallel.

In step S306, the signal processing apparatus 100 determines the suppression value of audio playback gain from the variable playback speed of video. That is, the signal processing apparatus 100 according to the present embodiment suppresses the audio playback gain during variable speed playback, in order to ensure that the viewer is able to recognize the change in state due to the change in audio, and determines a specified value indicating how much to suppress the audio playback gain at this time.

Auditory testing revealed that the change in sound expression was felt when the audio playback gain for suppressing the volume at the start of variable speed playback of video was suppressed to around −20 dB of a reference value (value before the start of variable speed playback). On the other hand, in the case where the suppression amount of gain was less than 10 dB, that is, in the case where the gain was higher than −10 dB of the reference value, there were cases where the change was more difficult to discern. Also, when the suppression amount of gain was large, and the gain was lower than −30 dB of the reference value, the volume was close to being muted, and there were cases where viewers felt a sense of incongruity. Thus, in one example, the suppression value is determined such that the audio playback gain will be lower than or equal to −10 dB and higher than or equal to −30 dB of the reference value.

Here, audio expression that is more suited to the playback state can be performed, by determining the suppression amount of gain according to the playback speed during variable speed playback. That is, the suppression amount of gain is increased, in the case where, for example, the change in video playback speed from standard speed playback is large and the change in video expression is also large, such as with stop-motion playback of v=0 and super slow-motion playback of v=0.02 (1/50× playback) or the like. On the other hand, the suppression amount of gain can be reduced, in the case where the change in video playback speed, that is, the change in video expression, is not so large, such as with slow-motion playback of v=0.25 (1/4× playback), for example, even with variable speed playback. In one example, a configuration may be adopted in which the audio playback gain is suppressed to from −20 dB to −30 dB during stop-motion and super slow-motion playback, and the audio playback gain is suppressed to only around −15 dB during slow-motion playback. Also, in the case where the playback speed is greater than or equal to a predetermined speed, and the change in video expression is small, such as with slow-motion playback of v=0.75, for example, even with variable speed playback, suppression of audio playback gain need not be performed. An example of the relationship between the variable playback speed of video and the audio playback gain is shown in FIG. 5.

Figure 5:
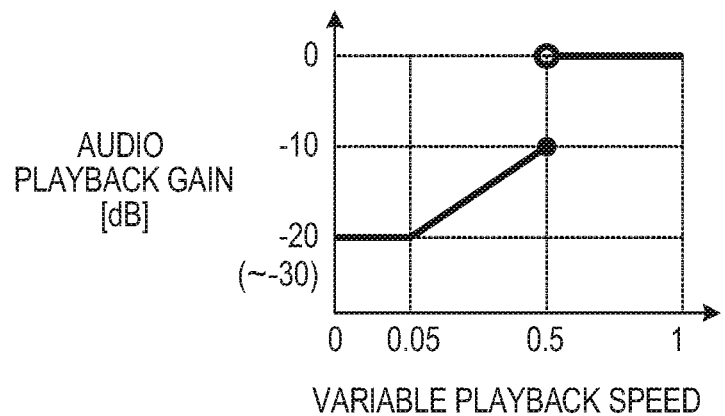
FIG. 5 is a diagram showing an example of the relationship between the playback speed of video and audio playback gain.

The signal processing apparatus 100 determines the suppression value of audio playback gain, using a relationship such as shown in FIG. 5, for example. In the example in FIG. 5, the audio playback gain is not suppressed in the case where v>0.5 (playback faster than 1/2×), and the audio playback gain is reduced as the value of v decreases in the case of v≤0.5, with a lower limit of −20 dB to −30 dB being reached at v=0.05. In other words, the audio playback gain is more greatly suppressed as the change in video playback speed increases at the timing at which the playback mode switches from standard speed playback to variable speed playback. Note that FIG. 5 is one example, and the relationship between the variable playback speed of video and the audio playback gain is defined in various modes. For example, a value other than 0.5 may be used as a predetermined speed ratio for ensuring that suppression of the audio playback gain is not performed on a value of v exceeding that other value, and values other than −20 dB to −30 dB may be used as the lower limit of the audio playback gain after suppression. Other settings (e.g., an upper limit of audio playback gain in the case where v is less than or equal to a predetermined speed, the slope in the interval between the upper limit and the lower limit thereof, etc.) can also be suitably configured.

In the example in FIG. 4, since standard speed playback of v=1 is performed in the interval from P0 to P1, the audio playback gain is not suppressed and a reference value (0 dB) is used, as shown as an audio playback gain 404. The audio playback gain is then suppressed from the reference value to −20 dB which is the suppression value, at the timing P1 on the playback time axis at which the video playback speed switches from standard speed playback to variable speed playback. Note that setting the audio playback gain after suppression to −20 dB is one example, and the audio playback gain after suppression can be determined, according to the definition of the relationship between variable playback speed and audio playback gain and the actual variable playback speed, as shown by a bidirectional arrow 405. Here, it is assumed, for example, that suppression of the audio playback gain is performed in accordance with FIG. 5 and that variable speed playback of v≤0.05 is performed in the interval from P1 to P2. As a result, the audio playback gain is suppressed to −20 dB at the timing P1.

As described above, the audio playback gain is suppressed at the start of variable speed playback of video to differentiate the audio playback gain before and after the point in time at which variable speed playback is started. In this way, the expressive power of content can be enhanced, by synchronizing the start timings of the change in video expression and sound expression. Note that fade processing (processing for lowering the audio playback gain gradually) may be performed at the time of suppressing the audio playback gain, as shown by the audio playback gain 404 in FIG. 4, and a configuration may also be adopted in which the audio playback gain changes discontinuously with P1 as the boundary. Also, in the case where fade processing is performed, the viewer is able to readily feel the change in audio expression, as a result of the change in audio playback gain being configured to be comparatively steep. Note that in the case where a plurality of variable speed playback intervals are set, a suppression value of audio playback gain that differs for each variable speed playback interval according to the variable playback speed can be applied.

In step S307, the signal processing apparatus 100 calculates the average amount of change spanning the video variable speed playback interval of the virtual viewpoint position and orientation obtained in step S302, and determines the length of time for maintaining the suppression value of audio playback gain determined in step S306 from this average amount of change. That is, with the signal processing apparatus 100, the audio playback gain is suppressed as in step S306, at the start of variable speed playback of video, and since video expression returns to its original state when returning from variable speed playback to standard speed playback, the audio playback gain can also be returned to the reference value (0 dB) at the end of variable speed playback. At this time, the signal processing apparatus 100 is able to continue maintaining the audio playback gain in the suppressed state throughout substantially the entire interval of variable speed playback, although in order to enhance the quality of expression, suppression of the audio playback gain can be canceled at an early stage to enable raising of the audio playback gain to be started. Here, the signal processing apparatus 100 shortens the time for which the suppression value of audio playback gain is maintained, that is, shortens the time until the audio playback gain starts to be raised from the suppression value, as the average amount of change in the virtual viewpoint position and orientation spanning the variable speed playback interval increases.

As described above, in step S305, the audio signal is generated from the audio recording signal using the virtual viewpoint position and orientation and the position information of the audio recording signal, with the change in the position (direction) of sound and the like also increasing as the change in the virtual viewpoint position and orientation increases at this time. For example, in the case where the virtual viewpoint position moves so as to revolve about the point of regard, in a state where the virtual viewpoint orientation (direction) continues to face the point of regard (player of interest, etc.) in a sports scene, audio such as the surrounding cheers will also rotate with the movement of the virtual viewpoint.

By adopting this configuration, the feeling that the audio is rotating with the rotation of the virtual viewpoint can be effectively represented. However, when the audio playback gain continues to be maintained in the suppressed state throughout substantially the entire interval, the change in the direction of sound caused by change of the virtual viewpoint can no longer be felt very much. As mentioned above, the signal processing apparatus 100 thus shortens the time for maintaining the state where the audio playback gain is suppressed, as the average amount of change in the virtual viewpoint position and orientation in the variable speed playback interval of video increases. Since the timing for starting to raise the audio playback gain is thereby brought forward, the viewer can be made to feel the change in sound (direction) caused by the change in the virtual viewpoint for a longer time. On the other hand, the signal processing apparatus 100 may continue maintaining the state where the audio playback gain is suppressed, throughout substantially the entirety of the variable speed playback interval, in the case where there is a lack of change in the virtual viewpoint in the variable speed playback interval. Thus, the signal processing apparatus 100 determines a time length K for maintaining the state where the audio playback gain is suppressed, according to the average amount of change in the virtual viewpoint position and orientation in the variable speed playback interval, as shown by a bidirectional arrow 406 in the audio playback gain 404 of FIG. 4. In other words, the signal processing apparatus 100 controls the timing for changing the audio playback gain in the variable speed playback interval, based on the amount of change in the viewpoint during the playback period of the video signal.

The signal processing apparatus 100 can calculate the amount of change in the position of the virtual viewpoint, as the norm of the change per unit time on the playback time axis regarding a three-dimensional position vector described in units of meters ([m]), for example. Also, the signal processing apparatus 100 can calculate the amount of change in the orientation of the virtual viewpoint, as the norm of change per unit time, regarding a three-dimensional orientation vector of roll, pitch and yaw expression described in units of degrees ([deg]), for example. The signal processing apparatus 100 can then perform weighted addition of the amount of change in position and the amount of change in orientation, for example, and, furthermore, takes a value obtained by averaging the addition results spanning the variable speed playback interval as the average amount of change in the virtual viewpoint position and orientation. Note that the weight in weighted addition referred to here can be decided according to the environment at the time of recording. That is, in the case where a strong sound is issued from a predetermined direction, and sounds from other directions are weak, a weight that places greater importance on orientation over position is used. On the other hand, a weight that places greater importance on position over orientation can be used, in situations such as where a similar sound is issued from a plurality of positions that enclose the virtual viewpoint position. With regard to the environment at the time of recording, a configuration may, for example, be adopted in which a value indicating the environment is included within an audio recording signal, thus enabling the signal processing apparatus 100 utilizing the audio recording signal to judge that environment. Also, the signal processing apparatus 100 may, for example, calculate the change in sound for samples of the position and orientation of a plurality of virtual viewpoints, and decide the weight after determining whether either position or orientation strongly affect the audio to be output. The signal processing apparatus 100 can select and use one of a plurality of weight candidates stored in the storage unit 101, for example, according to the situation.

The signal processing apparatus 100 determines what percentage of a time length $\Delta P_{12}$ of video variable speed playback to set to a time K for maintaining suppression of the audio playback gain, for example, according to the average amount of change in the virtual viewpoint position and orientation. For example, the signal processing apparatus 100 is able to determine α as α=min ((average amount of change in virtual viewpoint position and orientation)/(threshold value), 1), and determine the time K as K=(1−α)$\Delta P_{12}$. Also, the signal processing apparatus 100 may determine the time K, by storing the average amount of change in the virtual viewpoint position and orientation and the time K in association with each other in advance or using a function capable of calculating the time K directly from the average amount of change in the virtual viewpoint position and orientation. In this case, however, the signal processing apparatus 100 sets K=$\Delta P_{12}$ in the case where the associated or calculated value exceeds $\Delta P_{12}$. Note that in the case where the average amount of change in the virtual viewpoint position and orientation and the time K are stored in association with each other in advance, this information is stored in the storage unit 101, for example.

By determining the maintenance time K, a timing Pa (=P1+K) for starting to raise the audio playback gain from the suppression value is determined on the playback time axis, as shown by the audio playback gain 404 of FIG. 4. Note that the signal processing apparatus 100 may be configured to start to raise the audio playback gain immediately after suppression, with maintenance time K=0 (Pa=P1), particularly in the case where the time length $\Delta P_{12}$ of video variable speed playback is short.

Note that the amount of change in the position of the audio recording signal (position of the microphone) described in a head coordinate system that is defined by the virtual viewpoint position and orientation may be used, instead of or in addition to the amount of change in the virtual viewpoint position and orientation. That is, a configuration may be adopted in which the time for maintaining the state where the audio playback gain is suppressed is shortened as the average amount of change in the position of the audio recording signal described in the head coordinate system spanning the variable speed playback interval increases. Note that in the case where a plurality of audio recording signals are used, a further average of the average amounts of change in the positions of the audio recording signals may be used in determining the time for maintaining the state where the audio playback gain is suppressed. Note that the further average of the plurality of average amounts of change regarding the positions of a plurality of audio recording signals can be calculated by a weighted average that uses a greater weight as the sound approaches the virtual viewpoint, for example.

Note that when there is a large amount of change in the virtual viewpoint position and orientation, the amount of change in the video signal per unit time on the playback time axis, or in other word, the difference between frames of the video signal will be large. In view of this, the difference between frames of the video signal per unit time or the size of a motion vector (optical flow) may be calculated as the amount of change in the video signal, instead of or in addition to the amount of change in the virtual viewpoint position and orientation. A configuration may be adopted in which the average value of the amount of change in the video signal spanning the variable speed playback interval is used as the average amount of change, and the time for maintaining the state where the audio playback gain is suppressed is shortened as the average amount of change of the video signal increases. Even in the case where, for example, there is no concept of a virtual viewpoint such as using the video capturing signal of a single camera directly as a video signal, the state in which the audio playback gain is suppressed can thereby be maintained across substantially the entire interval of variable speed playback, if the average amount of change of the video signal is small. On the other hand, in the case where the average amount of change in the video signal is large, such as when the camera continues panning, the timing for starting to raise the audio playback gain from the suppression value can be brought forward.

Note that the signal processing apparatus 100 may use the average amount of change in the virtual viewpoint position and orientation, the average amount of change in the position of the audio recording signal described in the head coordinate system, and the average amount of change of the video signal in combination.

In step S308, the signal processing apparatus 100 determines the amount of change at the time of returning the audio playback gain from the suppression value to the reference value (0 dB), based on the amount of change in the video variable speed playback interval of the virtual viewpoint position and orientation obtained in step S302. For example, the signal processing apparatus 100 increases the amount of change at the time of returning the audio playback gain from the suppression value to the reference value (0 dB) as the amount of change obtained in step S302 increases. That is, when the amount of change (motion) of the virtual viewpoint (video signal) is large, the amount of change after starting to raise the audio playback gain from the suppression value in the variable speed playback interval is increased, and when the motion of the virtual viewpoint is small, the amount of change is reduced. The suddenness or slowness of the change in video expression and audio expression thereby coincide, enabling expressive power to be further enhanced. An example of such control is shown in FIG. 6.

Figure 6:
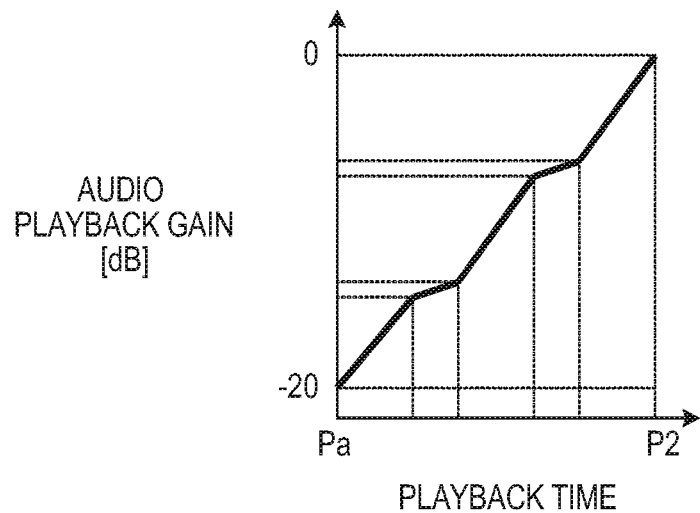
FIG. 6 is a diagram showing an exemplary temporal change in audio playback gain.

FIG. 6 shows an example of the case where the movement of the virtual viewpoint changes (fluctuates) from sudden-→slow→sudden→slow→sudden from Pa at which the audio playback gain starts to rise to P2 at which the audio playback gain returns to zero. In this case, the audio playback gain rises with a large amount of change (steep slope) in the case where the movement of the virtual viewpoint is sudden, and rises with a small amount of change in the case where the movement of the virtual viewpoint is slow. For example, the momentary amounts of change in the audio playback gain can be determined, by allocating the amount of change in the audio playback gain from the suppression value to the reference value (20 dB in total), according to the percentage obtained by dividing each momentary amount of change in the virtual viewpoint position and orientation by the sum thereof within the period from Pa to P2.

Note that, similarly to step S307, an amount of change in the video signal, such as the amount of change in the position of an audio recording signal described in the head coordinate system, the difference between frames and the size of a motion vector (optical flow), may be used, instead of or in addition to the amount of change in the virtual viewpoint position and orientation.

Note that in the case where the amount of change of the virtual viewpoint or the video signal is roughly constant throughout the variable speed playback interval, the audio playback gain may be changed monotonically, as with the audio playback gain 404 in the playback interval Pa to P2 in FIG. 4. At this time, the audio playback gain does not necessarily need to be changed linearly, and may be changed in accordance with a suitable curved shape such as a sigmoid function shape, for example.

After P2 at which video variable speed playback ends and the audio playback gain returns to the reference value, the audio playback gain is maintained at the reference value until P3 at the end, as shown in the audio playback gain 404 of FIG. 4.

Note that, in the case where the time length $\Delta P_{12}$ of video variable speed playback is particularly short, even when control of the audio playback gain is performed, the volume is momentarily reduced and instantly returns to its original level, and thus the viewer can conversely be left with a sense of incongruity. Thus, a configuration may be adopted in which the processing of steps S306 to S308 for controlling the time chart for audio playback gain is not performed, in the case where the time length of video variable speed playback is less than a predetermined length. The predetermined length referred to here is 0.5 second, for example. Note that, in the case where a plurality of variable speed playback intervals exist, it is determined whether to perform control of the audio playback gain every variable speed playback interval, according to the time length of each variable speed playback interval.

In step S309, the signal processing apparatus 100 executes synchronous playback of the video signal and the audio signal, by synchronizing the video signal generated in step S304 and the audio signal generated in step S305 and outputting the synchronized signals to the output unit 105. At this time, the synchronized signals are output after applying the audio playback gain determined in steps S306 to S308 for the audio signal, according to the video playback frame rate set in step S304 for the video signal. Note that the signal processing apparatus 100 may output the synchronized signals to the storage unit 101 as an audio/video file, or may transmit the synchronized signals to another device via the communication unit 106, instead of or in addition to outputting the synchronized signals to the output unit 105. That is, although the signal processing apparatus 100 executes control for synchronizing and playing back the video signal and audio signal that were generated, that playback may be performed by an external device that is not the signal processing apparatus 100.

According to the above configuration, the change in video expression and the change in audio expression can be made to coincide, as a result of the audio playback gain being suppressed when variable speed playback of video is started, and, as a result, the expressive power of content can be enhanced.

Note that although, in the abovementioned embodiment, the suppression amount of the audio playback gain is determined in step S306 based on the variable playback speed of video, the method of determining the suppression amount is not limited thereto. For example, in the case where the amount of change in the virtual viewpoint position and orientation is large, the suppression amount of gain may be larger than in the case where the amount of change is small, or conversely, in the case where the amount of change in the virtual viewpoint position and orientation is large, the suppression amount of gain may be smaller than in the case where the amount of change is small. Also, although, in the abovementioned embodiment, the time for maintaining the suppressed state of the audio playback gain and the amount of change in the audio playback gain are determined in steps S307 and S308 based on the amount of change in the virtual viewpoint position and orientation, the present invention is not limited thereto. For example, at least one of the maintaining time for the suppressed state of the audio playback gain and the amount of change in the audio playback gain may be determined, based on the variable playback speed of video. Specifically, the maintenance time of the suppressed state of the audio playback gain may be lengthened or the amount of change in the audio playback gain may be reduced, as the variable playback speed of video becomes slower.

Also, although the abovementioned embodiment does not particularly refer to the method of suppressing the audio playback gain, a configuration may be adopted in which all frequency components are suppressed uniformly or in which only a specific frequency component, such as a high range or a low range, is suppressed. Also, the abovementioned embodiment mainly describes the case where the gain of the audio signal is smaller than a reference value (value before the start of variable speed playback) throughout substantially the entire variable speed playback interval (P1 to P2), as shown in FIG. 4. The present invention is, however, not limited thereto, and the gain of the audio signal may be the same as or larger than the reference value in at least part of the variable speed playback interval. Also, although, in the abovementioned embodiment, the volume of the audio signal whose gain has been suppressed is greater than zero (sound is not lost), the present invention is not limited thereto, and the volume may be set to 0 in at least part of the variable speed playback interval.

Figure 7:
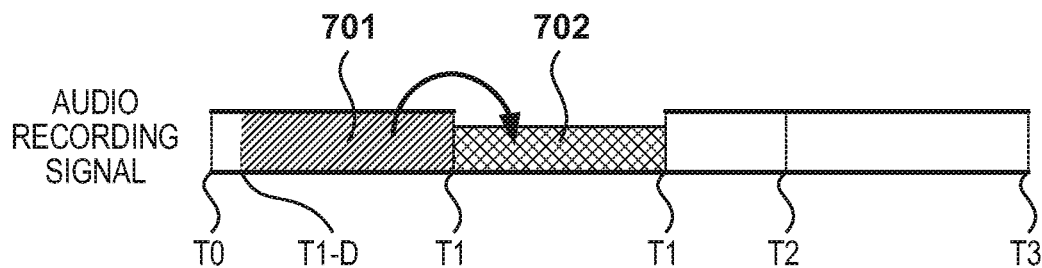
FIG. 7 is a diagram showing an example of an audio signal that is generated.

Also, in step S303, the time interval length of the audio recording signal is lengthened to be longer than the selection time interval length of the video capturing signal by the difference D ($=\Delta P_{03}-\Delta T_{03}$) of the time length $\Delta P_{03}$ of the video signal to be generated and the selection time interval length $\Delta T_{03}$ of the video capturing signal. However, the present invention is not limited thereto. For example, a configuration may be adopted in which the time interval of the audio recording signal is made to coincide with the time interval ($\Delta T_{03}$) of the video capturing signal, and the audio signal is generated by repeatedly using a specific time interval of the audio recording signal, for a time period corresponding to the difference D. For example, as shown in FIG. 7, times (T1−D) to T1 are used as the specific time interval of the time interval length D, and an audio recording signal 701 of this interval is repeatedly used as an audio recording signal 702 that is inserted between the audio recording signals of times T0 to T1 and times T1 to T2. That is, in the playback interval P0 to P1 on the playback time axis, the video capturing signal and audio recording signal of times T0 to T1 are both used. Then, in the playback interval P1 to P2, the video capturing signal of times T1 to T2 and the audio recording signal of times (T1−D) to T2 are used. Also, in the playback interval P2 to P3, the video capturing signal and the audio recording signal of times T2 to T3 are both used. The sum total of the time interval lengths of the audio recording signals including the repetitions will be (T1−T0)+(T2−T1+D)+(T3−T2)=T3−T0+D=$\Delta T_{03}$+D=$\Delta P_{03}$. Accordingly, an audio signal having the same time length as the video signal can also be generated with such a technique, without performing waveform extension which is linked to sound quality degradation. Note that since the audio recording signal of the specific time interval is repeatedly used in this case, discontinuity involving switching from the audio recording signal at time T1 to the audio recording signal at time (T1−D) arises at the timing P1 on the playback time axis. However, since the audio playback gain is suppressed at the timing P1 at which the video playback speed switches to variable speed playback, the start of the change in video expression and the start of the change in sound expression are made to coincide to enhance expressive power, and discontinuity caused by repeatedly using the audio recording signal can be made less noticeable.

Note that a configuration may be adopted in which the audio signal is extended to conform to variable speed playback of video to perform variable speed playback. Since the audio playback gain is also suppressed at the timing at which variable speed playback is started in this case, sound quality degradation caused by extension can be made less noticeable. Also, by returning the audio playback gain gradually (continuously), the sense of incongruity that is given can be reduced due to the viewer becoming used to the sound quality degradation.

Note that although the abovementioned embodiment described playback of video and audio that had been recorded, a similar technique can also be applied to real-time playback. That is, it suffices for the audio playback gain to be suppressed at the timing at which the video playback speed is switched to variable speed playback, and the audio playback gain to be returned to the reference value at the timing at which the video playback speed returns to the standard speed. Also, during variable speed playback, the time length of the audio signal can be increased without performing waveform extension, by repeatedly using an audio recording signal that is temporally in the past.

The start of the change in video expression and the start of the change in sound expression are also made to coincide to enable expressive power to be enhanced, in the case where high-speed playback (fast forward) where v>1 is performed, by suppressing the audio playback gain at the timing at which the video playback speed switches from standard speed playback to variable speed playback. At this time, the suppression value of audio playback gain can be set to a smaller value as the variable playback speed increases. That is, a configuration may be adopted in which the audio playback gain suppression value is reduced as the change in video playback speed increases at the timing at which the playback mode switches from standard speed playback to variable speed playback. Note that, in high-speed playback, the time length $\Delta P_{03}$ of the video signal to be generated will be shorter than the time length $\Delta T_{03}$ of the selection time interval of the video capturing signal. Thus, in step S303, the signal processing apparatus 100 determines an interval that is shorter than the time length of the selection time interval of the video capturing signal by a difference Dh ($=\Delta T_{03}-\Delta P_{03}$) as the time interval of the audio recording signal. Note that, in this case, the time interval of the audio recording signal can be determined, such that the recording timing of the audio recording signal and the video capture timing of the video capturing signal coincide, at the timing at which the video playback speed returns to standard speed playback.

Also, although, in the abovementioned embodiment, uniform speed playback of v=1 was given as standard speed playback, a configuration may be adopted in which slow-motion playback of v=0.5, for example, is given as standard speed playback, and variable speed playback is given as super slow-motion playback of v=0.02 or stop-motion playback of v=0, for example. In this case, the audio playback gain is not suppressed, in the case where v=0.5, for example. Note that, in this case, the same processing as the abovementioned processing can be performed, by using a signal obtained by extending the audio signal to twice its length as reference audio. Rather than extending the audio signal, however, it may be determined to use the audio recording signal of a longer time interval or repeatedly using the audio recording signal of a partial time interval.

Note that the signal processing apparatus 100 may obtain the time chart for video playback speed by analyzing the video signal in step S301. For example, the signal processing apparatus 100 monitors the amount of change in difference between the size of a local motion vector related to an object and the size of a global motion vector related to motion of the camera (viewpoint), using machine learning or the like, and detects change in the video playback speed related to the object. For example, the signal processing apparatus 100 is able to estimate v by the rate of change in the size of motion thereof, in the case where motion of an object or global motion changes compared with the time interval up until that point, and is able to determine whether the interval is an interval in which slow-motion playback or super slow-motion playback is performed. Also, the signal processing apparatus 100 is able to detect a ball in a sports scene, for example, estimate v by the ratio of the fall speed and the free-fall speed of the ball after reaching the highest point, and determine whether the interval is an interval in which slow-motion playback or super slow-motion playback is performed. Note that the abovementioned example is one example, and video playback speed may be estimated using the motion of other objects. The amount of change in step S307 to step S308 can also be calculated from the video signal. In this way, it becomes possible to apply the abovementioned technique while reducing the time and effort of user operations, by estimating video playback speed, the amount of change in the virtual viewpoint position and orientation and the like from the video signal.

Also, the signal processing apparatus 100 can analyze a video capturing signal to identify scenes that the user tends to be interested in and perform slow-motion playback or the like, and can autonomously generate a time chart, such that this scene is set to variable speed playback. For example, the signal processing apparatus 100 can be configured to perform machine learning in which a large number of video capturing signals and correct data that indicates scenes to undergo variable speed playback as production in those video capturing signals serve as inputs, and to generate a time chart for video playback speed, based on a result of the learning. Similarly, the signal processing apparatus 100 may be configured to identify the amount of change in the virtual viewpoint position and orientation from video capturing signals based on machine learning or the like. A time chart for video playback speed suitable for video capturing signals can thereby be automatically generated, even when there is not a video signal or a user input that includes a variable speed playback interval generated by a third party.

Note that the video capturing signal need not necessarily have been captured with a camera, and may be computer graphics (CG) or the like. Also, the audio recording signal need not have been recorded with a microphone at the same time as the video capturing signal, and may, for example, be BGM, a sound effect created so as to be compatible with the video capturing signal, or the like.

Note that an audio output mechanism of the output unit 105 can be configured by a speaker. In this case, the signal processing apparatus 100 may be configured to generate an audio signal for speaker playback by well-known panning processing or the like, such that the sounds of the audio recording signals are played back from respective directions.

According to the present invention, any sense of incongruity in audio expression at the time of change of a video playback operation can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-137340, filed Jul. 13, 2017, which is hereby incorporated by reference herein in its entirety.

What is claimed is:

1. An audio processing apparatus, comprising:
one or more hardware processors; and
one or more memories which store instructions executable by the one or more hardware processors to cause the audio processing apparatus to perform at least the processes of:
determining a change of speed of a video from a first speed to a second speed that is lower than the first speed;

processing an audio signal such that a volume of sounds to be played with the video is decreased from a first volume to a second volume at a changing point in time at which the determined change of the speed of the video occurs, wherein sounds of the first volume and the second volume are not silent; and outputting the processed audio signal for the sounds to be played before and after the changing point in time.

2. The audio processing apparatus according to claim 1, wherein the volume of the sounds becomes smaller as the speed of the video becomes slower.

3. The audio processing apparatus according to claim 1, wherein, in a case where the speed of the video before a first specific point in time is the first speed, the speed of the video after a second specific point in time that is after the first specific point in time is the first speed, and the speed of the video in a period between the first specific point in time and second specific point in time is the second speed, the audio signal is processed such that a volume parameter of the audio signal is decreased from a reference value to a value that differs from the reference value at the first specific point in time, and the volume parameter is increased from the value that differs from the reference value to the reference value at the second specific point in time.

4. The audio processing apparatus according to claim 1, wherein, in a case where the speed of the video in a period that starts from the changing point in time is the second speed, and the speed of the video after the period is the first speed, the volume of the sounds is continuously increased within the period.

5. The audio processing apparatus according to claim 1, wherein the instructions further cause the audio processing apparatus to perform:
determining an amount of change of an image in the video caused by playback of the video, and
wherein a volume of the sounds in a period that starts from the changing point in time is determined based on an amount of change of the image in the video during the period.

6. The audio processing apparatus according to claim 1, wherein the instructions further cause the audio processing apparatus to perform:
determining an amount of change of a viewpoint associated with the video caused by playback of the video, and
wherein a volume of the sounds in a period that starts from the changing point in time is determined based on an amount of change of the viewpoint associated with the video during the period.

7. The audio processing apparatus according to claim 1, wherein the instructions further cause the audio processing apparatus to perform:
obtaining at least one of video change information for identifying an amount of change of an image in the video caused by playback of the video and viewpoint change information for identifying an amount of change in a viewpoint associated with the video, and
controlling a timing for changing a volume parameter of the audio signal in a period that starts from the changing point in time, based on the obtained information, in a case where the speed of the video in the period is the second speed.

8. The audio processing apparatus according to claim 1, wherein the instructions further cause the audio processing apparatus to perform:
obtaining at least one of video change information for identifying an amount of change of an image in the video caused by playback of the video and viewpoint change information for identifying an amount of change in a viewpoint associated with the video, and
controlling an amount of change in a volume parameter of the audio signal in a period that starts from the changing point in time, based on the obtained information, in a case where the speed of the video in the period is the second speed.

9. The audio processing apparatus according to claim 1, wherein in a case where the speed of the video changes from the first speed to a speed greater than or equal to the first speed at another changing point in time, a volume of sounds is the same before and after the other changing point in time.

10. The audio processing apparatus according to claim 1, wherein, in a case where a length of a period in which the speed of the video in the second speed and that starts from the changing point in time is greater than or equal to a predetermined length, a volume of the sounds is decreased after the changing point in time compared to before the changing point in time, and, in a case where the length of the period is less than the predetermined length, a volume of the sounds is the same before and after the changing point in time.

11. The audio processing apparatus according to claim 1, wherein the change of the speed of the video is determined based on information indicating a mode of a playback speed of the video at a point in time that is included in a playback period of the video.

12. The audio processing apparatus according to claim 1, wherein the first speed is a speed corresponding to standard speed playback.

13. The audio processing apparatus according to claim 1, wherein the processing the audio signal includes controlling a gain parameter for playback of the audio signal.

14. The audio processing apparatus according to claim 1, wherein the processed audio signal is output to at least one of a storage device and a speaker.

15. An audio processing method being executed by a processor of an audio processing apparatus and comprising:
determining a change of a speed of a video from a first speed to a second speed that is lower than the first speed;
processing an audio signal such that a volume of sounds to be played with the video is decreased from a first volume to a second volume at a changing point in time at which the determined change of the speed of the video occurs, wherein sounds of the first volume and the second volume are not silent; and
outputting the processed audio signal for the sounds to be played before and after the changing point in time.

16. A non-transitory computer-readable storage medium storing a computer program for causing a computer provided in an audio processing apparatus to:
determine a change of a speed of a video from a first speed to a second speed that is lower than the first speed;
process an audio signal such that a volume of sounds to be played with the video is decreased from a first volume to a second volume at a changing point in time at which the determined change of the speed of the video occurs, wherein sounds of the first volume and the second volume are not silent; and
output the processed audio signal for the sounds to be played before and after the changing point in time.

17. The audio processing apparatus according to claim 1, wherein the video changes from a standard speed motion picture to a slow motion picture at the changing point in time; and the volume of the sounds to be played with the video decreases at the changing point in time.

18. The audio processing apparatus according to claim 1, wherein the speed of the video is defined as a ratio of a time length for image capturing to a time length for playback of a video obtained by the image capturing.

* * * * *